Jan. 26, 1971    ATSUFUMI UEKI    3,559,102

ULTRA-HIGH-SPEED LASER LIGHT PULSE GENERATOR

Filed Dec. 26, 1968

INVENTOR.
ATSUFUMI UEKI

BY
Hopgood & Calimafde
ATTORNEYS 3,559,102
ULTRA-HIGH-SPEED LASER LIGHT PULSE
GENERATOR
Atsufumi Ueki, Tokyo, Japan, assignor to Nippon Electric Company, Limited, Tokyo, Japan, a company of Japan
Filed Dec. 26, 1968, Ser. No. 786,946
Claims priority, application Japan, Dec. 29, 1967, 43/85,139
Int. Cl. H01s 3/10
U.S. Cl. 332—7.51
3 Claims

ABSTRACT OF THE DISCLOSURE

A laser pulse generator is described which operates with a mode-locking device to produce light pulses in a stable manner at the mode-locking frequency. A third reflector is employed which is located in reflecting relationship with the laser pulses produced with a laser resonator and is located at a preselected distance from one of a pair of reflectors which define a laser resonator in conjunction with a lasing medium.

---

This invention relates to an ultra-high-speed laser light pulse generator for a pulse communication system using a laser and the like.

In an article by R. T. Denton et al., disclosed on pages 1472 to 1473 of the "Proceedings of IEEE," vol. 54, No. 10 (October 1966), a pulse communication system is proposed which utilizes a light modulator to switch pulses supplied from a forcibly mode-locked laser. An increase of the laser pulse repetition frequency is generally desired in order to increase the transmission information rate per unit time but the increase often encounters several obstacles. As described in an article by T. Uchida and A. Ueki, disclosed on pages 17 to 30 of the "IEEE Journal of Quantum Electronics," vol. QE–3, No. 1 (January 1967), the forced mode-locking of a laser occurs only when the frequency of the locking signal is approximately equal to the fundamental frequency $f_p = C/2L$ of the resonator multiplied by an integer $n$, where C and L indicate light velocity and the length of the laser resonator, respectively. Even if the locking signal frequency is increased by choosing the integer $n$ to be large enough, the increase in the laser pulse repetition frequency beyond a certain value is extremely difficult, because the pulse repetition frequency range obtainable by the forced mode-locking is practically limited by the relaxation constant of the laser medium. For example, in a 6328 A. He-Ne laser containing a gas at total pressures around 1 torr, light pulses with repetition frequencies between 80 to 150 mHz. are easily obtainable, but light pulses at frequencies beyond 200 mHz. are rarely obtained by selecting the integer $n$ to be larger than 2. Even when such high-frequency repetition rate is obtained, it is not of practical use because of unstable phenomena concerning the repetition frequency, such as a fall in oscillation frequency to $1/n$ caused by small fluctuations in the length L of the resonator. Another inadequate method for increasing the repetition frequency of the light pulses is the raising of the resonator fundamental frequency $f_p = C/2L$ by reducing its length L, and accompanied by simultaneously mode-locking for $n=1$. Although in the latter case the above-mentioned instability for $n \geq 2$ does not occur, the output level considerably decreases because of the shortened length of the laser medium.

It is therefore the object of the present invention to provide an ultra-high-speed laser light pulse generator capable of generating high power pulses at high repetition rates with excellent stability.

The above-mentioned and other features and objects of this invention and the manner of attaining them will become more apparent and the invention itself will best be understood by reference to the following description of embodiments of the invention taken in conjunction with the accompanying drawings, the description of which follows.

Figure 1:
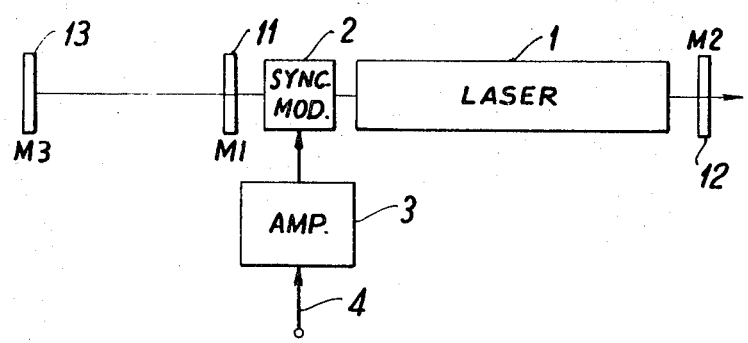
FIG. 1 is a block diagram of an embodiment of the invention.

According to the present invention, there is provided an ultra-high-speed laser light pulse generator which comprises a laser oscillator having a composite resonator composed of a pair of resonator-length-defining reflectors and another reflector disposed at a selected distance from one of said resonator reflectors with the distance equal to $k/n$ times as great as the optical length between said resonator-length-defining reflectors where $n$ is an integer larger than one, $k$ is a positive integer, and $n$ and $k$ are mutually prime; and means for mode-locking the oscillation of the laser oscillator.

The present ultra high-speed laser light pulse generator differs from conventional light pulse generators which are mode-locked in that the pulse generator in accordance with this invention uses a third reflector. For illustration, the mode-locking of a conventional laser oscillator is first considered. In a mode-locked laser, $m$ light pulses reciprocate between two reflectors constituting the resonator, with mutually identical intervals and at the velocity of light. The output pulses from the generator are therefore obtained at an interval period of $2L/mC$. Thus, an output is produced every time a light pulse arrives at one of the resonator-defining reflectors, with a portion of the light pulse being partially passed through the reflector. The repetition frequency of the light pulses is $$mf_p = mC/2L$$

In order to realize mode-locking with a pulse repetition frequency $mf_p$, the frequency of the locking signal must be approximately equal to an integral multiple of the repetition frequency $mf_p$. Consequently, if the frequency of the locking signal is $nf_p$, the light pulses of the repetition frequency $mf_p$ can be generated, where $m$ is a divisor of $n$. However, the pulse repetition frequency is limited due to the nonlinearity of the laser medium. In a laser employing a resonator composed of only two reflectors and having a locking frequency considerably higher than the optimum frequency determined by the relaxation constant of the laser medium, the realizable repetition frequency is not the locking frequency $nf_p$ but $mf_p$, which is in most cases the above-mentioned optimum frequency ($m$: a divisor of $n$). As described above, light pulses arrive at one of the resonator-defining reflectors at a period $2L/mC$. If a third reflector is disposed at a distance $kL/n$ from the first reflector, the portion of the light pulse that passed through the first reflector is returned thereto at an interval taking $$\left(\frac{k}{n} \cdot \frac{2L}{C}\right)$$

second. This returned portion of the light pulse again enters into the laser oscillator after passing through the first reflector. Now, the relation between the returning pulse and $m$ light pulses in the oscillator will be considered.

Since the light pulse trains generated in the laser oscillator arrive at the first reflector at the interval of $n/m$ time unit ($n/m$: an integer) and since the returning pulse arrives at the first reflector at a time delayed by $k$ time units (where one time unit is equal to $2L/nC$ and $n$ and $k$ are prime to one another), the returning pulse is never coincident with the light pulses in the laser so long as $m$ is not equal to $n$. This returning light pulse prevents the laser from generating a light pulse with a repetition frequency $mf_p$ or, in other words, from being brought to the $mf_p$-locking state. Also, the returning light pulse coincides with the oscillation light pulse in the laser only when the laser is in the $nf_p$-locking state with $m$ being equal to $n$. Thus, introduction of the third reflector enables us to limit the stable locking to the case of the $nf_p$-locking. Therefore, according to the invention, a light pulse generator for generating the ultra-high-speed pulse with the high repetition rate can be provided at no substantial cost of the output power which is reduced by the reduction of the length of the laser medium.

Referring to FIG. 1, a preferred embodiment of the present invention comprises: a He-Ne laser discharge tube 1; an internal AM locking modulator 2 made of KDP; a driving amplifier 3; and three reflectors 11, 12 and 13. The reflectors 11 and 12 constitute a laser resonator containing the laser discharge tube 1 and the internal modulator 2 therebetween. The optical distance L of the resonator is approximately equal to $nC/2f_r$, where $f_r$ is the desired repetition frequency of the light pulses. For example, if $n$ is 2 and $f_r$ is 300 mHz., L is set at 1 meter, so that the well-known and available He-Ne laser tube with a length of 80 cm. can be used. Therefore, if the transmissivity of the reflector 12 is chosen to be several percents, the output power of the laser light is several tens of milliwatts (for L=50 cm., the output power is usually a few milliwatts). The internal modulator 2, to which a locking signal 4 of a frequency $f_r$=300 mHz. is applied through the driving amplifier 3, causes the laser to be mode-locked and to generate a light pulse train. The reflector 13 is installed at a distance $L/n$=50 cm. from the reflector 11 an so arranged to reflect back to the laser resonator the laser light passing through the reflector 11. Since the installation of the reflector 13 is intended only to reflect the laser light, it preferably should provide perfect reflection.

In the above explanation of the embodiment of FIG; 1, the distance between the reflectors 13 and 11 is assumed to be $L/n$ for illustration convenience. As is clear from the description of the principle of the present invention, however, the distance may be $kL/n$ ($k$ and $n$ are prime to one another) in order that the returning light pulse does not coincide with the light pulse with a repetition frequency $f_r/m$ ($m$: an integer larger than one). For the numerical example of $n$=2 and $L$=1 meter, the distance between the reflectors 11 and 13 may be 150 cm., 250 cm., and others. Also, for $n$=3 and $L$=150 cm., this distance may be 100 cm. or 200 cm. or 250 cm. in addition to 50 cm. The object of the internal modulator 2 is to introduce a variable loss of a magnitude larger than a certain threshold and at intervals determined by $1/f_r$ to provide mode-locking of the laser pulses. The position of the modulator 2 need not necessarily be between the reflector 11 and laser tube 1, but may be between the reflector 12 and tube 1.

Next, the performance of the embodiment of FIG. 1 will be illustrated with reference to FIG. 2. FIG. 2(A) shows the variation in time of the loss provided by internal modulator 2, the frequency of which is equal to the locking signal frequency $f_r$. In case the reflector 13 does not exist, the repetition frequency of light pulse is equal to $f_r/p$ ($p$: an integer), because, as described above, the frequency $f_r$ is chosen to be considerably higher than the optimum repetition frequency. For the numeral example used concerning FIG. 1, that is, $f_r$=300 mHz. and $n$=2, the repetition frequency is not $f_r$=300 mHz. but $f_p$=150 mHz.=$f_r/2$, because the optimum frequency ranges from 80 to 150 mHz.

Figure 2:
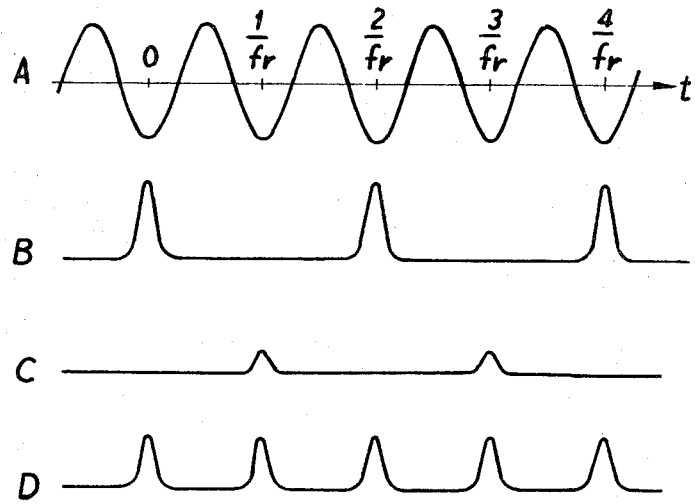
FIG. 2 is a waveform diagram for illustrating the performance of the embodiment.

FIG. 2(B) shows a laser light pulse arriving at the reflector 11. Since the light pulse passes through the internal modulator 2 when its loss is smallest, the phase relation between the loss variation (A) and the light pulse (B) becomes as shown in FIG. 2. If the third reflector 13 is disposed at a distance $L/n$=50 cm. from the reflector 11 to reflect the light pulse passing through the reflector 11, the reflected pulse returns to the reflector 11 at $2L/nC$ second ($=1/f_p=1/f_r=10/3$ nanoseconds) later. FIG. 2(C) shows this returning light pulse. Since this returning light pulse passes through the internal modulator 2 when it gives the smallest loss to the light pulse, it is amplified in the laser tube 1, with the result that another light pulse is generated between the pulses having low repetition frequency as shown in FIG. 2(B). Thus, the most stable mode-locking condition without the mirror 13, that is, the repetition frequency $f_p$=150 mHz.=$f_r/n$ becomes unstable. Therefore, only the $nf_p$-locking frequency (in the above numerical example $f_p=f_r$=300 mHz.) is realized in a stable manner because of the returning pulse. FIG. 2(D) illustrates a light pulse train obtained in the $nf_p$-locking state. Since the light pulse train with a repetition frequency $f_r=nf_p$ is derived from the reflector 12, an ultra-high-speed laser pulse generator of high output power is obtained.

Figure 3:
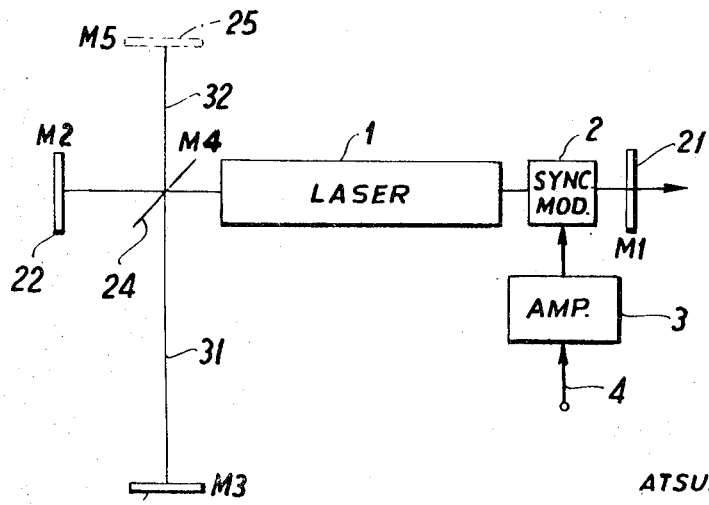
FIG. 3 is a block diagram of another embodiment of the invention.

Referring to FIG. 3, another embodiment of the present invention is shown and comprises: a He-Ne laser discharge tube 1; an internal AM locking modulator 2 made of KDP; a driving amplifier 3; and four reflecting mirrors 21, 22, 23 and 24. Similar to the embodiment of FIG. 1, the reflecting mirrors 21 and 22 constitute a laser resonator containing the laser discharge tube 1 and the internal modulator 2 therebetween. A locking signal 4 is applied through the driving amplifier 3 to the internal modulator 2 for mode-locking of the laser oscillation. In addition to the arrangement mentioned above, a third reflecing mirror 23 is installed in the embodiment of FIG. 3 so that light reflected by the semitransparent reflecting mirror 24 (beam splitter) interposed between the reflecting mirrors 21 and 22 may be returned to the laser. Since the optical length between the reflecting mirrors 21 and 23 must be $kL/n$ in order to obtain light pulses at a repetition frequency equal to the locking signal frequency $f_r=nf_p$, where $n$ and $k$ are prime to each other, the integer $k$ in the embodiment of FIG. 3 is usually larger than $n$. Since there are two transmitting directions 31 and 32 for the light beam reflected by the semi-transparent reflecting mirror 24, the light beam transmitted in the direction 32 increases resonator loss, causing a decrease in output power. In order to eliminate the adverse effect of this reflected light along direction 32, one may either utilize an interference effect between beam 32 and the light beam 31 after the latter has passed through the semitransparent mirror 24 upon return from the reflecting mirror 23, or utilize the reflection of beam 32 by another reflecting mirror 25 to return it to the laser resonator. In the first alternative, the relative positions between the reflecting mirrors 21, 22, 23 and 24 must be rigidly and accurately controlled with an accuracy of a wavelength or better, whereas in the second alternative, the precise fixing of the relative position of the reflecting mirrors is not necessary. In the preferred second alternative, no energy loss arises but the distance between the reflecting mirrors 25 and 22 must be $k'L/n$ (where $k$ is an integer being prime to $n$).

Although the embodiments of the present invention are explained with reference ot a resonator composed of reflecting mirrors 11 and 12 or 21 and 22, the set of the reflecting mirrors 11, 12, 13 or 21, 22, 23 or 21, 22, 23, 24, 25 or 21, 22, 24, 25 may be considered to constitute a composite laser resonator. It makes no difference that the laser oscillation occurs utilizing the action of the composite resonator. Although the Q factor of the composite resonator in accordance with the invention is normally different for each mode, all the modes which have frequencies which differ by $nf_p=nC/2L$ have the same Q value. Accordingly, the intensity of the oscillation periodically varies in accordance with a period $n$, with the result that the so-called $mf_p$ or $mf'_p$ locking is realized. Since the spatial intervals of the reflecting mirrors are discrete, and since there are many oscillation modes among the modes having a maximum Q value, and since the perfect suppression of the oscillation in a mode other than that mentioned above is not necessary, the composite resonator according to the invention is quite different from the conventional laser pulse resonator.

In the embodiments of the invention, the position of the internal modulator 2 may be arbitrarily selected within the composite resonator, since the reflecting mirrors define the entire composite resonator. In order to obtain a high modulation ratio, the modulator 2 is preferably located at a position where the intensity of the laser light is high. The present invention includes the case where light oscillations in the embodiment of FIG. 1 are substantially formed by the reflecting mirrors 12 and 13 with reflectivity of the mirror 11 located therebetween being low. (For the numerical example used in the explanation of FIG. 1, $f_r=300$ mHz., $n=3$, $L=150$ cm. and $L/n=50$ cm.) The same is applicable to the laser resonator of FIG. 3, when the light oscillations are substantially formed by the reflecting mirrors 21 and 23 in combination with the reflecting mirror 22. Other gas lasers or solid state lasers may be substituted for the He-Ne laser discharge tube 1. Since the relaxation time is different for each laser material, the locking frequency varies depending upon the laser material used. The amplitude-modulating locking modulator made of KDP may be substituted by modulators made of other devices or materials such as those materials utilizing the electro-optical effect or magneto-optical effect, or devices like a supersonic AM modulator which scatters the light by a supersonic wave, or a frequency modulating device employing the supersonic vibratory surface of a reflecting mirror. Since the amplifier 3 amplifies the locking signal 4 and supplies the current or voltage necessary at the desired repetition frequency to the locking modulator 2, the driving amplifier 3 may be dispensed with if the modulator has a sufficiently high modulation sensitivity. The reflecting mirrors 11, 12, 13, 21, 22, 23, 24 and 25 may, where applicable, be replaced by reflecting devices such as corner prisms or etalon plates.

While the principles of the invention have been described in connection with specific apparatus, it is to be clearly understood that this description is made only by way of example and not as a limitation to the scope of the invention as set forth in the object thereof and in the accompanying claims.

I claim:

1. A device for generating laser pulses at a high repetition rate, comprising a lasing medium, a reflector resonator placed in laser pulse generation relationship with the lasing medium, said resonator including first and second reflectors selectively spaced from one another at a distance L with the lasing medium between them to produce a beam of laser pulses at a fundamental repetition rate, means for mode-locking the repetition rate of the laser pulses at a rate $n$ times the fundamental frequency where $n$ is a positive integer larger than one, a third reflector located outside of said resonator and in reflection relationship with the laser pulses generated between said first and second reflectors with the distance between said third reflector and one of the first and second reflectors being chosen according to the relationship $$\frac{k'}{n} \times L$$

where $k$ is a positive integer and where $n$ and $k$ are prime to one another, and a beam splitter located between said first reflector and the laser medium for directing a portion of each light pulse onto the third reflector.

2. The device as recited in claim 1, wherein the first, second and third reflectors are aligned with one another and with the laser medium with said second reflector being located at an intermediate position between said first and third reflectors.

3. The device as recited in claim 1 wherein a fourth reflector is arranged in reflective relationship with the laser pulses split off by the beam splitter, said third and fourth reflectors being located at opposite sides of the splitter and with the fourth reflector being selectively spaced from the other of said first and second reflectors at a distance chosen according to the relationship $$\frac{k'}{n} \times L$$

where $k'$ is a positive integer, and where $k'$ and $n$ are prime to one another.

References Cited

UNITED STATES PATENTS

| | | | |
|---|---|---|---|
| 3,187,270 | 6/1965 | Krogelnik et al. | 331—94.5 |
| 3,412,251 | 11/1968 | Hargrove | 331—94.5X |

OTHER REFERENCES

Di Domenico et al.: Locking of He-Ne Laser Modes by Intracavity Acoustic Modulation in Coupled Interferometers, in "Applied Physics Letters," Apr. 15, 1965, pp. 150–52.

RODNEY D. BENNETT, Primary Examiner

D. C. KAUFMAN, Assistant Examiner

U.S. Cl. X.R.

331—94.5